(12) United States Patent
Ono et al.

(10) Patent No.: US 6,220,758 B1
(45) Date of Patent: *Apr. 24, 2001

(54) ROLLER SUPPORTING DEVICE

(75) Inventors: Akira Ono; Yasunobu Imahata; Arihiro Kimura; Hiroshi Naitoh; Koichi Yamamoto; Takayuki Shibayama, all of Nagoya (JP)

(73) Assignee: Daido Metal Company, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,242

(22) Filed: Feb. 22, 2000

Related U.S. Application Data

(62) Division of application No. 09/095,309, filed on Jun. 10, 1998, now Pat. No. 6,056,442.

(30) Foreign Application Priority Data

Jun. 23, 1997 (JP) .................................................. 9-165632

(51) Int. Cl.[7] .................................................. F16C 33/10
(52) U.S. Cl. ........................ 384/286; 384/289; 384/292
(58) Field of Search ........................ 384/58, 155, 156, 384/286, 287, 288, 289, 290, 372, 377, 291, 292

(56) References Cited

U.S. PATENT DOCUMENTS

| 3,881,788 | 5/1975 | Kotauczek .................. 384/286 X |
| 5,385,408 | 1/1995 | Tevaarwerk .................. 384/155 X |
| 5,567,056 | 10/1996 | Blasé et al. .................. 384/286 |
| 5,797,364 | 8/1998 | Meek et al. .................. 123/90.36 |
| 5,823,154 | 10/1998 | Kuhn et al. .................. 123/90.33 |

FOREIGN PATENT DOCUMENTS

| 1236840 | 6/1971 | (GB) . |
| 2121888 | 1/1984 | (GB) . |
| 2188677 | 10/1987 | (GB) . |

*Primary Examiner*—Thomas R. Hannon
(74) *Attorney, Agent, or Firm*—Browdy and Neimark

(57) ABSTRACT

A roller supporting device which comprises a pair of supporting arms, a supporting shaft attached between the pair of supporting arms in a non-rotatable manner, and a roller having an inner hole in the central part thereof, the roller being disposed between the pair of supporting arms and being supported in a rotatable manner by the supporting shaft inserted through the inner hole, the roller being arranged to rotate along with the relative movement with a mating member by making the roller contact with the mating member, wherein a cut out portion, which extends in the axial direction on the outer circumferential surface of the supporting shaft, is formed at an appropriate portion except the portion on which the inner circumferential surface of the inner hole of the roller is pressed due to the load applied to the roller from the mating member, thereby defining an oil passage which extends in the axial direction between the supporting shaft and the inner circumferential surface of the inner hole of the roller.

3 Claims, 8 Drawing Sheets

Figure 1:
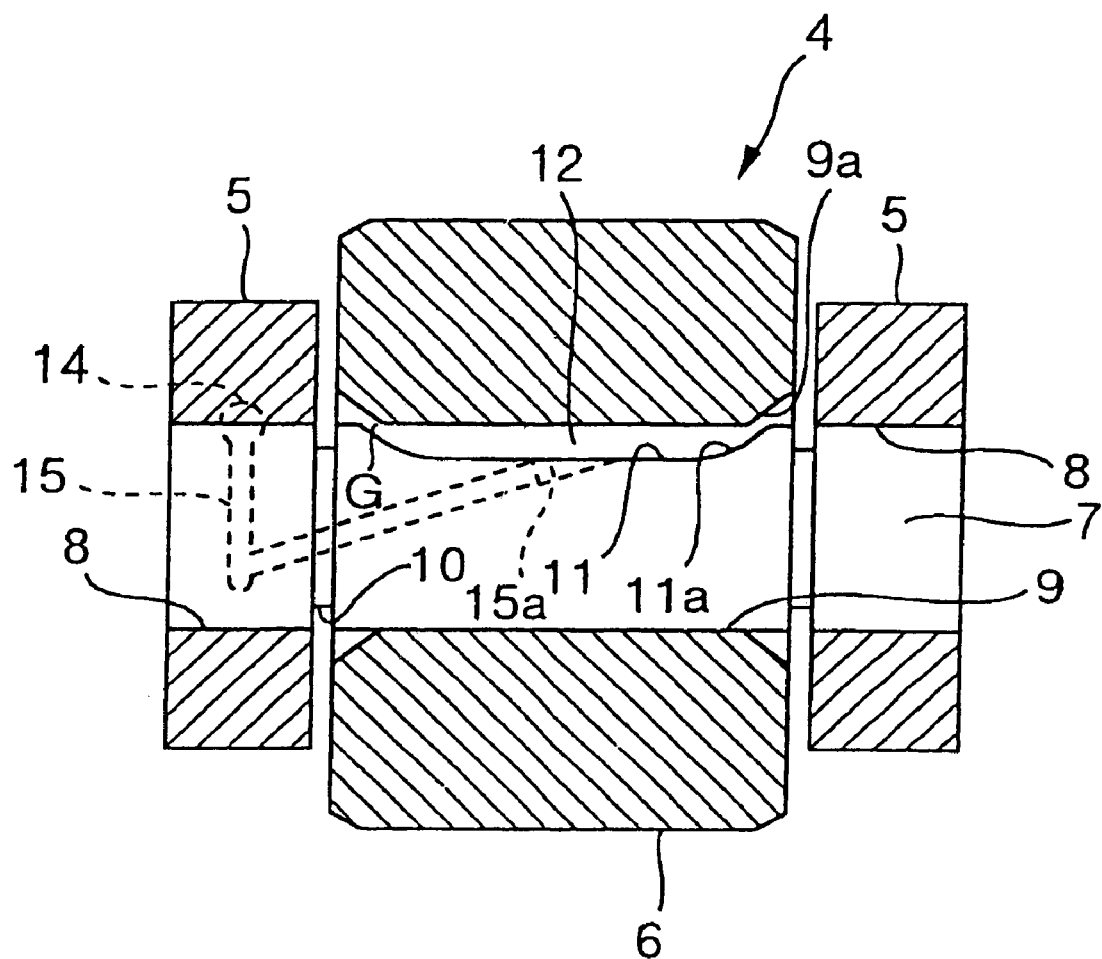

FIG.13A
FIG.13B
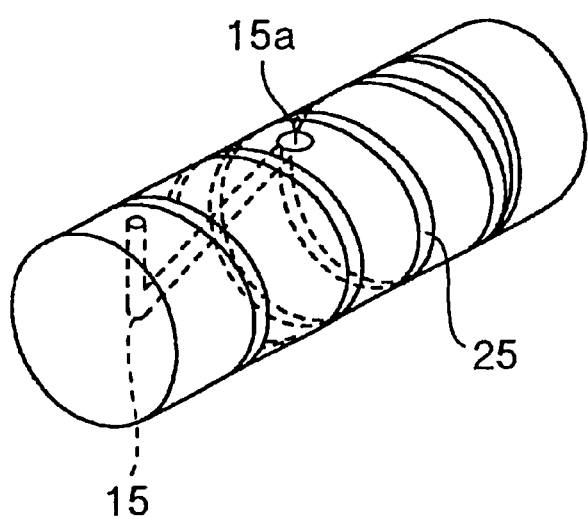
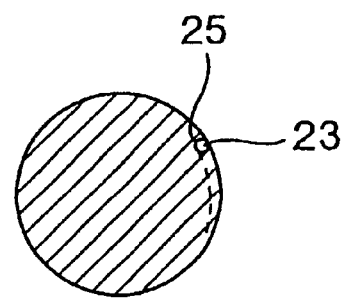

ROLLER SUPPORTING DEVICE

This is a division of parent application Ser. No. 09/095,309, filed Jun. 10, 1998 now U.S. Pat. 6,056,442.

BACKGROUND OF THE INVENTION

The present invention relates to a roller supporting device for supporting a roller which contacts with a mating member, particularly to a roller supporting device for preventing foreign matters from being bitten between an inner surface of the roller and a supporting shaft.

Generally, in a valve train an engine, a valve rocker arm is provided for converting the rotary motion of a cam into the opening and closing motion of the valve. The valve rocker arm operates for performing the rocking motion along with the rotary motion of the cam, the rocking motion further causing the opening and closing motion of the valve.

Among the above valve rocker arm, some of them employ a roller as a follower which contacts the rotating cam. The roller follower mechanism is composed of a pair of supporting arms made in a fork-shape on one side of the valve rocker arm and the roller rotatably supported between the pair of supporting arms by means of the supporting shaft. In this case, both ends of the supporting shaft are fixed to the pair of supporting arms, respectively, and the roller rotates around the supporting shaft.

In the roller follower mechanism like this, from the demand on strength, a combination of a relatively hard material is used for the roller and the supporting shaft such that the roller is made of hardened steel and the supporting shaft is made of such as phosphor bronze or a brass group material, hardened steel or a surface treated material produced through such as a nitriding treatment.

The roller and the supporting shaft made of the hard material like this are in some case used in sliding contact with each other through a bearing bush, but generally used in the direct sliding contact relationship. Generally in either case, to lubricate the sliding surfaces of both the supporting shaft and the roller, it is arranged such that oil filler ports are provided for communicating with the valve rocker shaft which is the rocking center of the valve rocker arm, the valve rocker arm, the supporting arm and the supporting shaft, in order, and the lubricating oil supplied from a lubricating system of the engine is fed to the sliding surfaces of the supporting shaft and the roller through respective oil filler ports, in turn.

However, with the conventional lubricating arrangement described above, foreign matters were sometimes bitten between the sliding surfaces of the supporting shaft and the roller. The main reason of the above bite is that the lubricating oil becomes to contain foreign matters while it flows through a long oil supply passage and hence the foreign matters are conveyed to the roller follower mechanism which is the final oiling target. In other words, the lubricating oil is arranged such that it is first pumped up from an oil pan of the engine, then supplied from the oil passage within the engine block to the sliding surface between the supporting shaft and the roller through each oil filler port of the above valve rocker shaft, the valve rocker arm, the supporting arm and the supporting shaft, in order. Therefore, the distance from the oil pan to the roller follower mechanism becomes rather long and further the oil passage is narrow having a complicated form.

Since the oil filler passage of this type is processed in many case by a cutting tool such as a drill, burrs or metal particles are sometimes produced in processing. If burrs or metal particles drop due to the vibration of the engine, they are conveyed as foreign particles in the lubricating oil to the sliding surfaces of the supporting shaft and the roller which are the final oiling position of the oil supplying passage. Further, particularly in case of a diesel engine, a combustion product such as the carbon sludge is mixed in the lubricating oil, resultantly the carbon sludge entering the sliding surface between the supporting shaft and the roller.

When the foreign matters enter the sliding surface between the supporting shaft and the roller, a defect such as scuffing and/or seizure is generated in the sliding surface inducing the usual rotation of the roller, resulting in the local wear in the outer circumferential surface of the roller, and further, in the defective opening and closing movement of the valve, and in its turn, generating the poor combustion of the engine causing an abnormal sound or an unusual vibration.

SUMMARY OF THE INVENTION

The present invention has been developed in view of the above circumstances. An object of the present invention is to provide a roller supporting device which is capable of rapidly removing foreign matters entered a sliding surface between a supporting shaft and a roller, or rapidly catching the entered foreign matters to prevent the generation of the scuffing and/or seizure in the sliding surfaces of the supporting shaft and the roller which is caused by the foreign matters bitten between the sliding surfaces of the supporting shaft and the roller.

The roller supporting device of the present invention comprises a pair of supporting arms, a supporting shaft attached to the pair of supporting arms in a non-rotatable manner, and a roller provided with a bearing hole in the central part thereof being disposed between the pair of supporting arms and rotatably supported by the supporting shaft inserted through the bearing hole, wherein the roller is arranged to contact a mating member so that the roller can rotate accompanying the relative movement with the mating member.

A first means of the present invention to achieve the object is to form a cut out portion extending in the axial direction on the outer circumferential surface of the supporting shaft in an appropriate portion except the portion on which the inner circumferential surface of the inner hole of the roller is pressed due to the load applied to the roller from the mating member, thereby composing an oil passage which extends in the axial direction between the supporting shaft and the inner circumferential surface of the bearing hole of the roller.

According to this means, the oil passage is provided at the portion except the portion which receives the load applied to the roller. At the portion where receives the load, the oil clearance between the inner hole of the roller and the supporting shaft is very narrow due to the load, but at the portion in which the oil passage is formed, the oil clearance is relatively large between the inner hole and the supporting shaft. Therefore, the lubricating oil supplied in the oil passage is apt to flow outside from the axial end of the oil passage, and when any foreign matters are mixed in the oil passage, the foreign matters will be discharged outside while being carried on the outwardly flowing lubricating oil.

As described above, since the foreign matters entered in the lubricating oil supplied in the oil passage is rapidly discharged outside, it becomes possible to prevent the foreign matters as much as possible from being bitten between the sliding surfaces of the inner circumferential surface of the roller and the supporting shaft.

The oil passage has the relatively large length, in its turn, has the relatively large capacity and hence it can also serve as a sump. Even if the foreign matters are bitten between the sliding surfaces of the supporting shaft and the roller, the heat generated due to the bite is absorbed by the lubricating oil in the oil passage, thereby preventing the seizure effectively.

A second means of the present invention is to form a helical groove in the outer circumferential surface of the supporting shaft, and build a helical oil passage by using this groove between the supporting shaft and the inner circumferential surface of the inner hole of the roller.

According to this means, since the oil passage is formed helical, a part of which is surely in the portion other than the portion which receives the load to be applied on the roller. Therefore, similarly with the case of the above first means, the lubricating oil supplied in the oil passage tends to flow outside from the axial end, thereby rapidly discharging the foreign matters mixed in the oil passage.

A third means of the present invention has an oil passage similar to those of the first and second means but different from those in that the end of the oil passage is open to the outside.

According to this means, since the foreign matters entered the oil passage becomes easy to flow out from the end thereof, it is possible to rapidly discharge the foreign matters outside.

A fourth means of the present invention has a concave portion formed in the outer circumferential surface of the supporting shaft.

According to this means, if the foreign matters are contained in the lubricating oil supplied to the sliding surfaces of the inner circumferential surface of the bearing hole of the roller and the supporting shaft, the foreign matters are stored in the concave portion and thus prevented to the utmost from being bitten between the sliding surfaces.

A fifth means of the present invention is realized by forming a helical groove in the outer circumferential surface of the supporting shaft and embedding the soft material elements in the groove. A sixth means of the present invention is realized by forming a concave portion in the outer circumferential surface of the supporting shaft and embedding the soft material elements in the concave portion.

According to the above fifth and sixth means, if the foreign matters are contained in the lubricating oil supplied to the sliding surfaces of the inner circumferential surface of the inner hole of the roller and the supporting shaft, the foreign matters are embedded in the soft material elements in the helical groove or the concave portion, and hence prevented to the utmost from being bitten between the sliding surfaces.

BRIEF DESCRIPTION OF THE INVENTION

Figure 2:
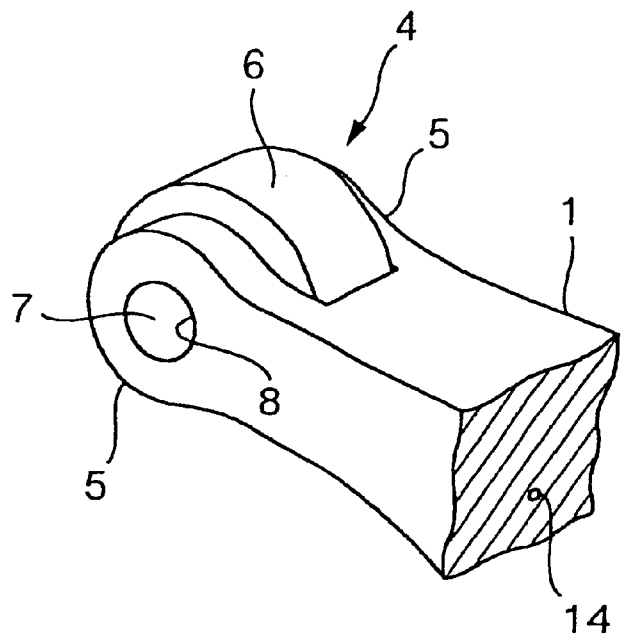
Figure 3:
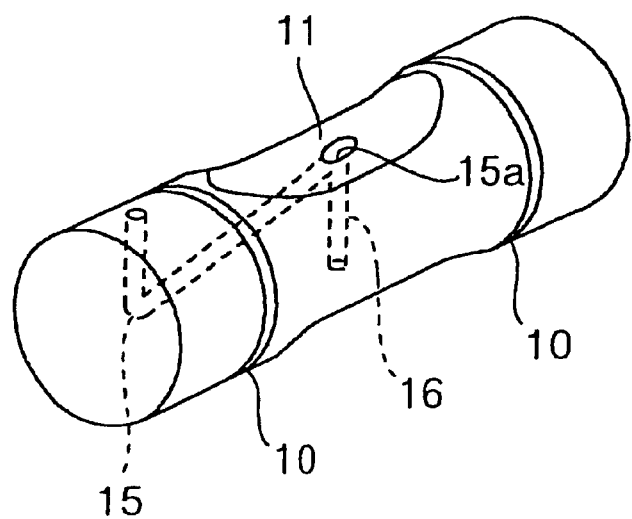
Figure 4:
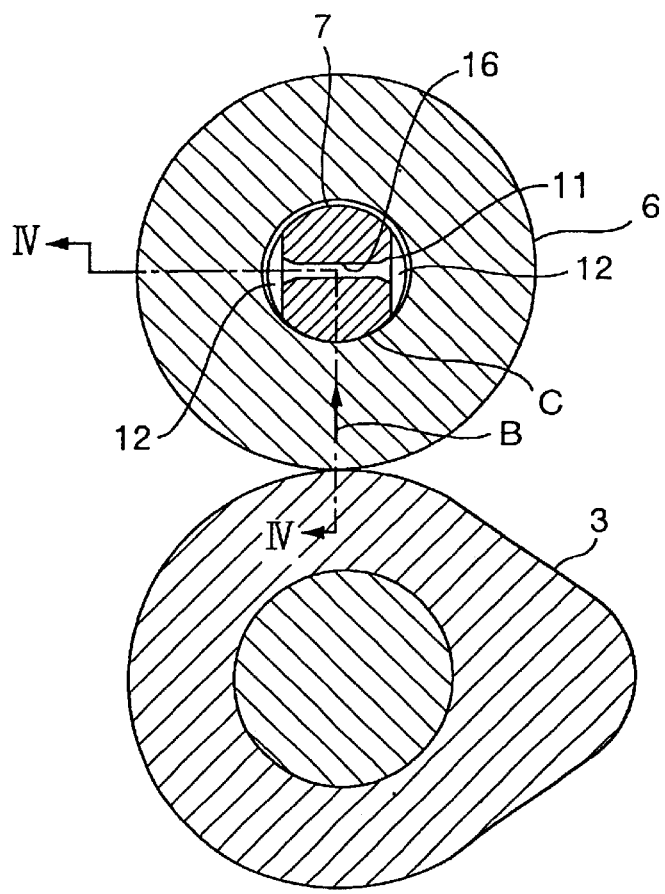
Figure 5:
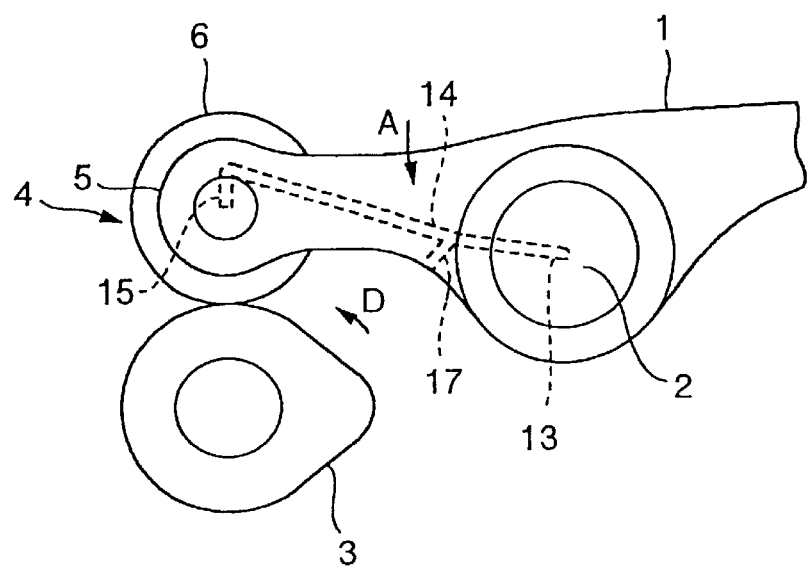
Figure 6:
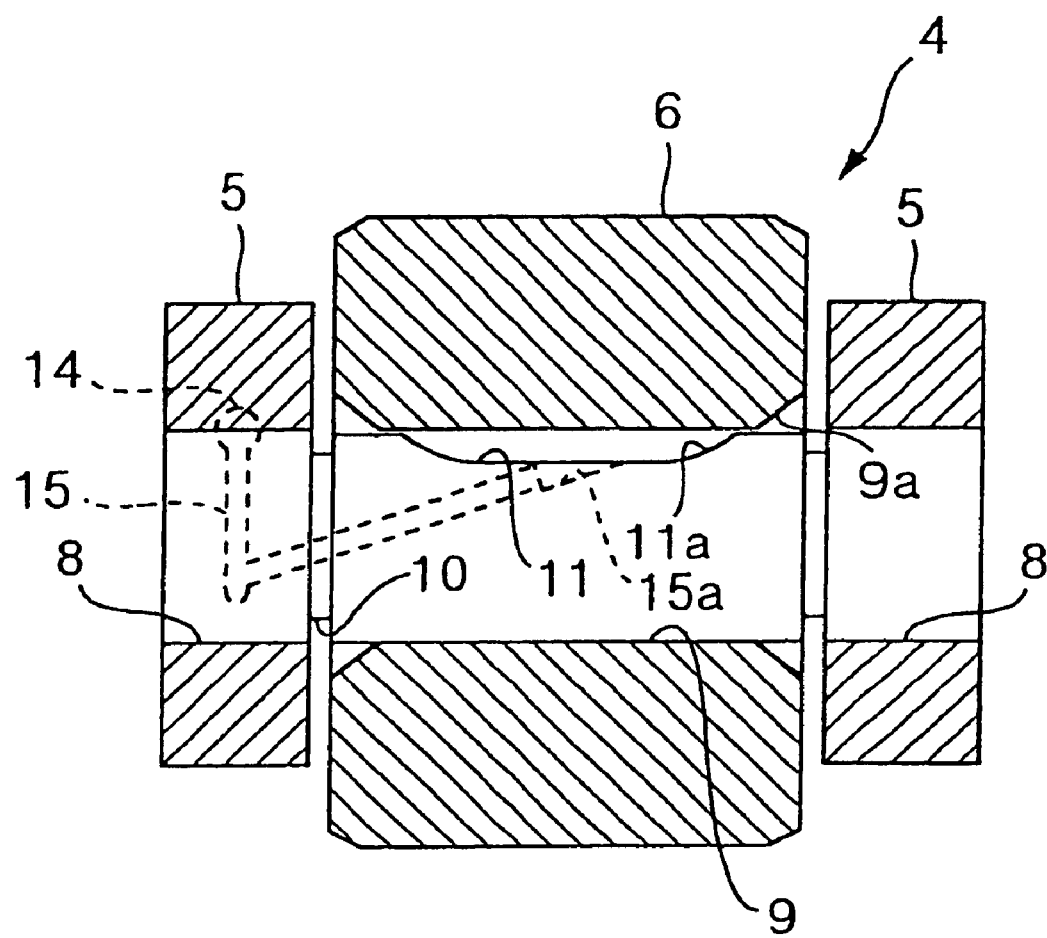
Figure 7:
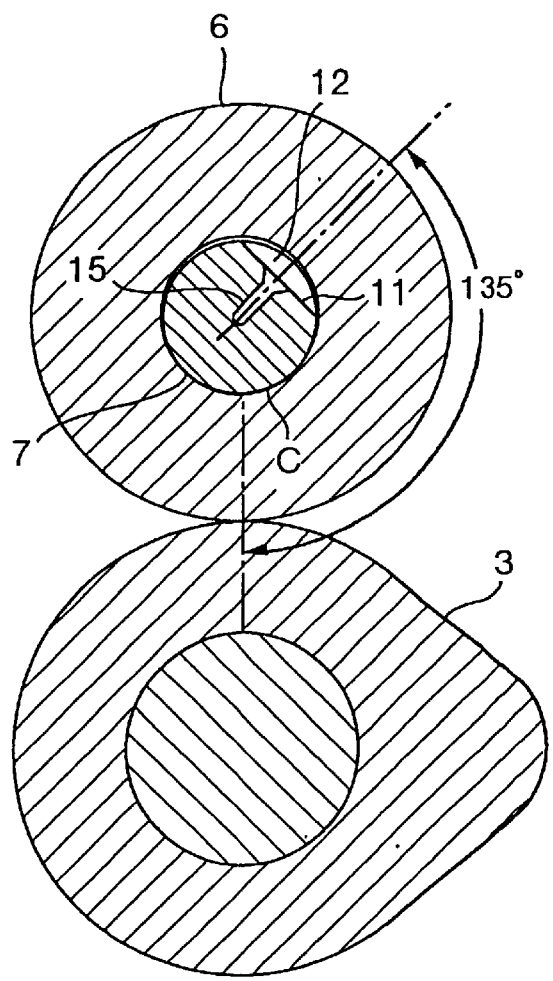
Figure 8:
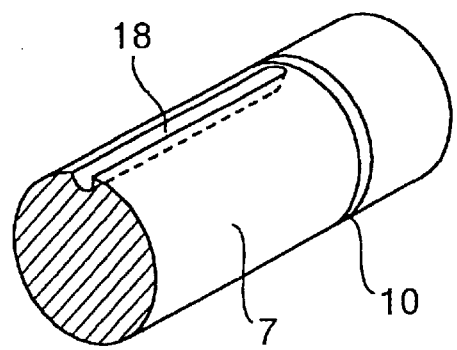
Figure 10A:
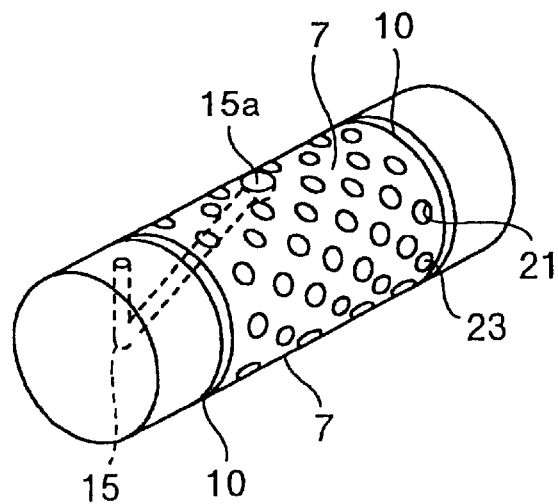
Figure 10B:
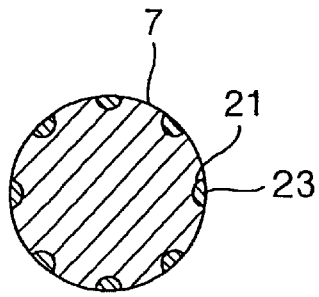
Figure 11:
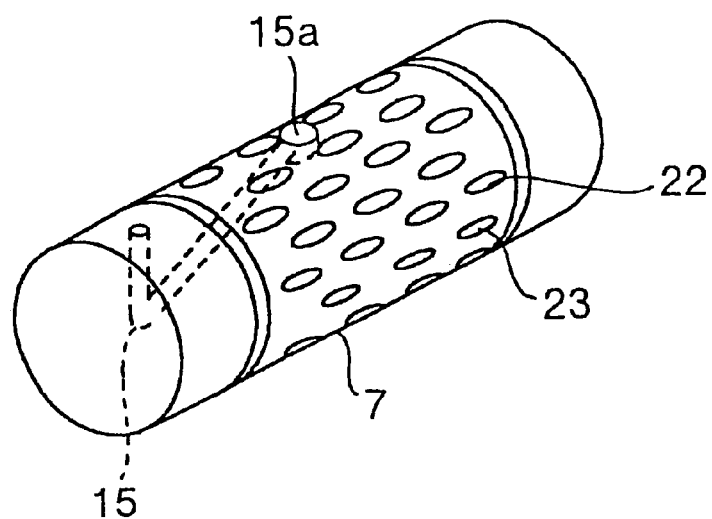
Figure 12:
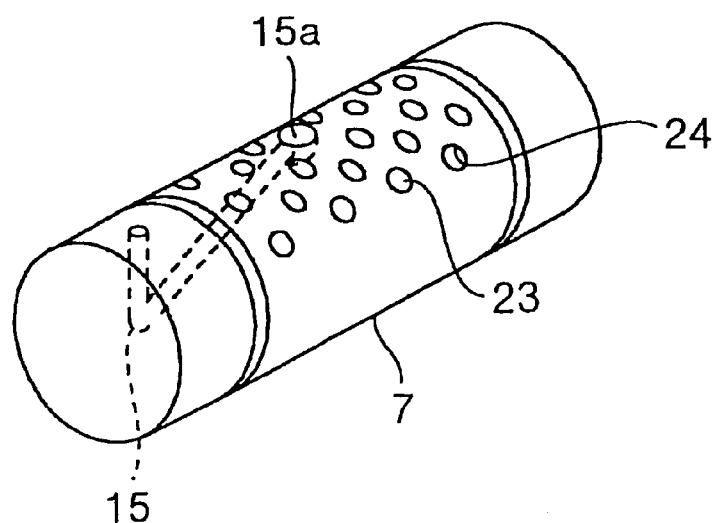

FIG. 1 is a vertical section showing a first embodiment of the present invention, which is taken along the IV—IV line in FIG. 4, FIG. 2 is a perspective view, FIG. 3 is a perspective view of a supporting shaft, FIG. 4 is a vertical section of a primary part, FIG. 5 is a side view, FIG. 6 is a view showing a second embodiment of the present invention, which corresponds to FIG. 1, FIG. 7 is a view showing a third embodiment of the present invention, which corresponds to FIG. 4, FIG. 8 is a partial perspective view showing a supporting shaft in a fourth embodiment of the present invention, FIG. 9 is a view showing a fifth embodiment of the present invention, (a) is a perspective view of a supporting shaft thereof, (b) is a partial vertical section of a roller and the supporting shaft thereof, FIG. 10 is a view showing a sixth embodiment of the present invention, (a) is a perspective view of a supporting shaft thereof, (b) is a vertical section of the same supporting shaft thereof, FIG. 11 is a perspective view showing a supporting shaft in a seventh embodiment of the present invention, FIG. 12 is a view showing an eighth embodiment of the present invention, which corresponds to FIG. 11, FIG. 13 is a view showing a ninth embodiment of the present invention, which corresponds to FIG. 10.

DESCRIPTION OF A PREFERRED EMBODIMENT

A first embodiment of the present invention applied to a roller follower mechanism of a valve rocker arm which is used in a valve train of an engine will be described with reference to FIGS. 1–5.

In FIG. 5 showing a primary part of the valve train, a valve rocker arm 1 is supported by a valve rocker shaft 2 movably in a rocking manner. On one end of valve rocker arm 1, a roller follower mechanism 4 is provided as a cam follower mechanism for converting the rotary motion of a cam 3 to the rocking motion of a valve rocker arm 1. Although it is not shown, the top of the shaft of an exhaust valve or an intake valve is arranged to contact the other end of the valve rocker arm 1 to convert the rocking motion of the valve rocker arm 1 into the vertical motion (opening and closing motion) of the valve.

Each of the above exhaust and intake valves is upwardly energized, that is, energized in the closing direction of the valve rocker arm 1 by means of a valve spring. Therefore, on the other end of the valve rocker arm 1 where the shaft of the valve contacts, the upward pressing force is always applied by the valve spring, and accordingly the valve rocker arm 1 always receives the rotary force in the direction of an arrow A by the valve spring working as an energizing means.

The above roller follower mechanism 4 corresponds to the roller supporting device of the present invention and details are illustrated in FIG. 1 and FIG. 2. Now, roller follower mechanism 4 will be described with reference to FIG. 1 and FIG. 2. Prior to the description thereof, it is noted that a pair of supporting arms 5, 5 is formed in a fork-shape on one end of the valve rocker arm 1 which serves as a supporter. The pair of supporting arms 5, 5 is provided with attachment holes 8, 8, for attaching a supporting shaft 7 which is used for supporting roller 6. The supporting shaft 7 is attached to the supporting arms 5, 5 in a non-rotatable manner. In this embodiment, both ends of the supporting shaft 7 are fixed to the attachment holes 8, 8 by press fitting, respectively.

The above supporting shaft 7 is inserted from one side of the roller 6 into one of the attachment holes 8, 8, via an inner hole 9 formed in the central part of the roller 6, and the other of the attachment holes 8, 8, in order with the roller being positioned 6 between a pair of supporting arms 5, 5. After finishing this process, the supporting shaft 7 is fixed between the pair of supporting arms 5, 5 and the roller 6 is rotatably supported by the supporting shaft 7 being positioned between the pair of supporting arms 5, 5.

As described above, since the valve rocker arm 1 is held under the rotary force effected by the valve spring in the direction of an arrow A, the roller 6 rotatably supported by the supporting shaft 7 is forcibly downwardly pressed on the outer circumferential surface of the cam 3 by the rotary force in the direction of the arrow A. As a result, the roller 6 receives the upward force from the cam 3 as the reaction of the pressing force, and consequently the supporting shaft 7 receives the upward reaction force. Therefore, the lower side of the supporting shaft 7 always receives the upward force from the roller 6.

The magnitude and the direction of the upward load exerted by the roller 6 on the supporting shaft 7 vary depending on the state of rotation of the cam 3, but the direction is, as shown by an arrow B in FIG. 4, is vertically upward, that is, approximately in alignment with a line connecting the contact point between the roller 6 and the cam 3 and the rotation center of the roller 6. Therefore, the portion of the supporting shaft 7 which receives the upward load from the roller 6 is limited to a narrow range on the lower surface thereof and does not vary widely in the circumferential direction. Here, the upward load applied on the supporting shaft 7 by the roller 6 is called as a main load B, and the lower surface of the supporting shaft 7 which receives the main load B is called as a main load receiving portion C.

Now, the supporting shaft 7 has respective annular grooves 10, 10 formed close to both end portions thereof press fitted in the pair of supporting arms 5, 5, and has a cut out portion 11 extending in the axial direction, the cut out portion 11 being formed by cutting out the part of the shaft in a plane from a position close to one of the annular grooves 10, 10 on one side to a position close to the other of the annular grooves 10, 10 on the other side in the part of the shaft except the main load receiving portion C, that is, on both radially opposite outside surfaces of the supporting shaft 7 in this embodiment. Then, as shown in FIG. 4, with this cut out portion 11, an oil passage 12 is defined between the supporting shaft 7 and the inner circumferential surface of the inner hole 9 of the roller, the oil passage 12 being positioned in radially right and left outsides and extending in the direction of the axis. It is noted that the width of the cut out portion 11 is illustrated broad in exaggeration in FIG. 4, but in practice, the narrower width will be allowable.

When the cut out portion 11 is formed for defining the passage 12 in this way at the portion of the supporting shaft 7 except the main load receiving portion C, the supporting shaft 7 receives the main load B exerted on the roller 6 with the cylindrical outer surface of the supporting shaft 7 which is in conformity with the cylindrical inner surface of the inner hole 9. Therefore, the cut out portion 11 for use for the oil passage 12 is formed while preventing the strength reduction of the supporting shaft 7 to the utmost.

On one hand, on both ends of the inner hole 9 of the roller 6, chamfers, for example, of about 45° are processed. The cut out portion 11 for defining the oil passage 12 extends to the outside of an inner edge of a chamfer 9a, thereby creating a gap between both axial ends of the oil passage 12 and the roller 6, the gap serving as an opening G for opening the oil passage 12 outside. Now, both sides of the above cut out portion 11 in the axial direction are configured in a circular arc concave form and each end of circular arc concave portions 11a is left open outside.

The above roller 6 and the supporting shaft 7 are both made of the hard material, for example, hardened steel and disposed directly contacting with each other. For lubricating sliding surfaces of these roller 6 and supporting shaft 7, a series of oil filler ports 13–15 are formed in a valve rocker shaft 2, the valve rocker arm 1, the supporting arm 5 on one side and the supporting shaft 7, and then the lubricating oil supplied from the lubricating system of the engine is supplied to sliding surfaces of the roller 6 and the supporting shaft 7 through the oil filler ports 13–15 provided in each portion. In this case, an end exit 15a of the oil filler port 15 of the supporting shaft 7 is communicated with the oil passage 12 on both opposite sides by way of a through hole 16 formed diametrically penetrating the supporting shaft 7 from one side to the opposite side.

The operation of the roller supporting device based on the above will be described hereinbelow.

While the engine runs, the lubricating oil pumped up from an oil pan is supplied to the oil passage 12 through the oil passage in the engine block, and through each of the oil filler ports 13–15 of the valve rocker shaft 2, the valve rocker arm 1, the supporting arm 5 and the supporting shaft 7, in order.

A part of the lubricating oil supplied to the oil passage 12 enters between the inner circumferential surface of the inner hole 9 of the roller 6 and the supporting shaft 7 to lubricate the sliding surfaces of the both. The residual lubricating oil flows in the oil passage 12 toward both ends of the supporting shaft 7 in the axial direction, and flows outside from the both side openings G produced by making the cut out portion 11 longer than the axial length of the sliding surface of the roller 6, and circulates by returning to the oil pan.

Now, when the foreign matters such as burrs or metal particles caused by cutting or drilling operation of the oil passage, or the carbon sludge produced through a combustion process are mixed in the lubricating oil fed from the pump, finally the foreign matters enter forcibly the oil passage 12. However, as described above, since the lubricating oil supplied in the oil passage 12 flows therein toward both axial ends of the supporting shaft 7 to flow outside from the opening G, the foreign matters also flow toward both axial ends of the supporting shaft 7 while being carried on the flow of the lubricating oil and are discharged out of the opening G.

In this case, in the present embodiment, since both ends of the cut out portion 11 are particularly formed to circular arc concave portions 11a, an end portion of the oil passage 12 changes gradually shallow, and accordingly the foreign matters are smoothly guided to the opening G further to be discharged out of the opening G.

Even if the foreign matters enter the oil passage 12 in this way, the foreign matters are rapidly discharged out of the oil passage 12, and the bite-in of the foreign matters between the sliding surfaces of the supporting shaft 7 and the inner circumferential surface of the bearing hole 9 of the roller 6, particularly between the sliding surfaces in the main load receiving portion C may be prevented to the utmost. Further, since the oil passage 12 extends axially and has a relatively large capacity, it always contains a considerable amount of the lubricating oil therein. Therefore, even if the foreign matters are bitten between the sliding surfaces of the supporting shaft 7 and the inner circumferential surface of the inner hole 9 of the roller 6 thereby generating heat caused by the friction due to the bite-in of the foreign matters, the heated portion is immediately cooled by the lubricating oil, and hence the possible seizure can effectively be prevented.

More specifically, as shown in the present embodiment, if the oil passage 12 is opened toward the outside by the opening G, it becomes possible to prevent the entering theirselves of the foreign matters by eliminating the oil filler port 15 for the supporting arm 5 and the supporting shaft 7 to shut the connection between the oil passage 12 and the oil filler port 14 of the valve rocker arm 1 so that the oil passage 12 may not serve as the final oil filler portion of the lubricating oil.

In other words, the valve rocker arm 1 has, in addition to the oil filler port 14, an oil filler port 17 diverging from the oil filler port 14. The diverged oil filler port 17 sprays a part of the lubricating oil, which flows in the oil filler port 14, between the cam 3 and the roller 6 for lubricating the rolling contact surface of the cam 3 and the roller 6. At this time, the cam 3 is rotating in the direction of an arrow D, thereby scattering the lubricating oil supplied from the diverged oil filler port 17. The scattered lubricating oil also falls on the opening G portion of the oil passage 12, then enters the oil passage 12 from the opening G to lubricate the sliding surface between the supporting shaft 7 and the inner circumferential surface of the inner hole 9 of the roller 6.

An oil supplying method toward the oil passage 12 like this is regarded as a kind of a splash type oil supplying method. With this method, since the most part of the foreign matters in the lubricating oil supplied from the lubricating system of the engine is returned to the oil pan together with the lubricating oil which is sprayed from the diverged oil filler port 17 toward the cam 3 and the roller 6 and dropped therefrom, the foreign matters have no chance to enter the oil passage 12, and hence the bite-in of the foreign matters in the sliding surface between the supporting shaft 7 and the inner circumferential surface of the inner hole 9 of the roller 6 can be prevented more positively. Further, if the oil filler port 15 for the supporting arm 5 and the supporting shaft 7 is eliminated, the processing of the oil filler port 15 also becomes unnecessary, thereby allowing to reduce the manufacturing cost.

FIGS. 6–8 show a second to a fourth embodiments of the present invention, respectively. It is noted that each of the second to the fourth embodiments corresponds to the modification of the above first embodiment, respectively.

The second embodiment shown in FIG. 6 will be firstly described. The second embodiment differs from the above first embodiment in that the length of the cut out portion 11 is slightly reduced in the axial direction than that of the first embodiment and both ends of the oil passage 12 are positioned inwardly than to the respective inner edges of chamfer portions 9a of the roller 6.

With this arrangement, the openings G of the first embodiment are eliminated, and outside both axial ends of the oil passage 12, there exist the portions in which the cylindrical inner circumferential surface of the inner hole 9 of the roller 6 and the outer circumferential surface of the supporting shaft 7 engage together with a minute oil clearance. This oil clearance is very narrow at the main load receiving portion C, but relatively large except therefor.

The portion where the oil passage 12 is provided is the portion of such a relatively large oil clearance other than the main load receiving portion C, and moreover, since the axial length of the oil clearance existing outside the oil passage 12 is short, the lubricating oil supplied in the oil passage 12 can relatively easily flow outside. Therefore, even if the foreign matters enter the oil passage 12, the foreign matters are rapidly discharged outside while being carried on the lubricating oil which flows outside through the oil clearance portion extending in the axial direction on both end sides of the oil passage 12.

Next, the third embodiment shown in FIG. 7 differs from the first embodiment in that, only one cut out portion 11 is formed in the supporting shaft 7. In this embodiment, the cut out portion 11 is situated at the position remote from the main load receiving portion C by 135 degree in the direction opposite to the rotary direction of the roller 6.

As described above, with only one oil passage 12, it is possible to achieve the same effect as that of the first embodiment. If the oil passage 12 is positioned as above, since the position is preferably convenient for the lubricating oil supplied in the oil passage 12 to form a lubricating oil film at the main load receiving portion of the supporting shaft 7, the thus obtained oil film is excellent in lubricating property.

Further, the fourth embodiment shown in FIG. 8 is different from the first embodiment in that the bottom of cut out portion 18 is formed in a circular arc concave manner.

Also in the present embodiment, the cut out portion 18 is determined as to be formed on the upper surface of the supporting shaft 7. In this case, since the foreign matters enter the oil passage 12 tend to sink in the lowermost position of the circular arc concave bottom portion of the cut out portion 18, it becomes possible to prevent the foreign matters from being bitten between the supporting shaft 7 and the inner circumferential surface of the inner hole 9 of the roller 6 before the foreign matters reach the axial directional ends of the oil passage 12.

Figure 9A:
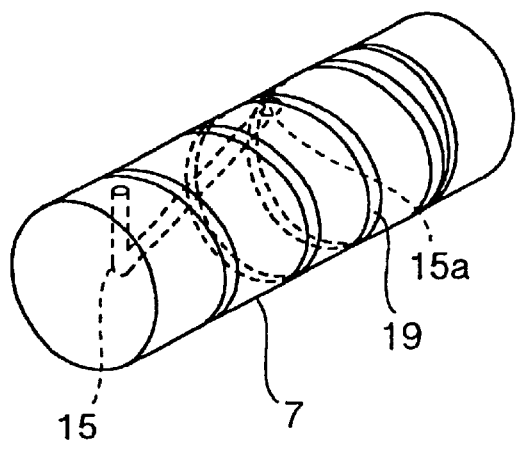
Figure 9B:
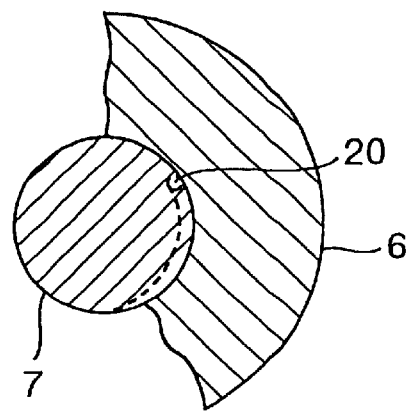

Now, FIGS. 9A and 9B show a fifth embodiment. The fifth embodiment is different from the first embodiment in that a helical groove 19 extending from one annular groove 10 to the other annular groove 10 is formed in the outer circumferential surface of the supporting shaft 7, and a helical oil passage 20 is defined between the supporting shaft 7 and the inner circumferential surface of the inner hole 9 of the roller 6 by this helical groove 19.

Now, an exit port 15a of the oil filler port 15 formed in the supporting shaft 7 is open in the helical groove 19. Therefore, the lubricating oil supplied from the oil filler port 15 in the oil passage 20 flows outside through the oil passage 20 from an opening similar to the opening G of the first embodiment. Accordingly, even if the foreign matters are included in the lubricating oil, the foreign matters are rapidly discharged outside while being carried on the lubricating oil which flows in the oil passage 20. Of course, since a considerable amount of the lubricating oil is contained in the helical oil passage 20, if the foreign matters are bitten between the sliding surfaces to generate heat, the heat becomes to be caught by the lubricating oil in the oil passage 20 and thus the possible seizure can be prevented.

FIGS. 10A, 10B and 11 show a sixth and seventh embodiments of the present invention, respectively. In the sixth and seventh embodiments, the axially extending oil passage 12 or the helical oil passage 20 as described above are not formed, and instead an exit port 15a of the oil filler port 15 of the supporting shaft 7 is directly open to the upper side of the cylindrical outer circumferential surface of the supporting shaft 7, thereby directly supplying the lubricating oil, fed from the oil filler port 15, between the sliding surfaces of the inner circumferential surface of the inner hole 9 of the roller 6 and the supporting shaft 7.

In the outer circumferential surface of the supporting shaft 7, in place of the oil passage, a number of axially extending circular concave portions 21 are formed in the sixth embodiment of FIG. 10 and a number of axially ellipsoidal concave portions 22 are formed in the seventh embodiment of FIG. 11. Soft material elements 23 made of metal such as Pb or Sn or resin are embedded in these concave portions 21, 22. In this case, it is determined that concave portions 21 or 22 are formed in each embodiment such that making one round around the outer circumferential surface of the supporting shaft 7 at any axial point of the same shaft leads to encountering at least one of the concave portions 21 or 22.

It is noted that concave portions 21, 22 can be formed by a form rolling or an etching method. For embedding the soft material elements 23 in the concave portions 21, 22, particularly when the soft material elements 23 are made of metal, the outer circumferential surface of the supporting shaft 7 is plated with the metal, and when the soft material elements 23 are made of resin, the resin is attached to the outer circumferential surface of the supporting shaft 7 by plating or spray coating, and then lathing or grinding is applied to the outer circumferential surface of supporting shaft 7 to make the soft material elements 23 remain only in the concave portions 21 or 22.

In the arrangement of each of the above sixth and seventh embodiments, if the foreign matters are contained in the lubricating oil supplied from the oil filler port 15, the foreign matters enter the oil clearance portion between the inner circumferential surface of the inner hole 9 of the roller 6 and the supporting shaft 7. The foreign matters entered the oil clearance portion transfer along with the rotation of the roller 6, and are embedded in the soft material elements 23 when the foreign matters encounter the concave portion 21, 22 on the way of transfer. Therefore, soft material elements 23 can catch the foreign matters rapidly, and particularly can prevent the foreign matters from reaching the main load receiving portion C.

An eighth embodiment of the present invention shown in FIG. 12 is different from the first embodiment in that concave portions 24 for embedding soft material elements 23 are formed on the portion of the supporting shaft 7 except for the main load receiving portion C, that is, in this embodiment, on the upper half of the supporting shaft 7 for the purpose of increasing the strength thereof. Further, even if the concave portions 24 are formed only in the upper half portion, since an exit port 15a of the oil filler port 15 is disposed in the upper portion opposite to the main load receiving portion C, the foreign matters are embedded in soft material elements 23 in the concave portions 24 before they reach the main load receiving portion C.

FIGS. 13A and 13B show a ninth embodiment of the present invention. This embodiment is also designed such that the foreign matters entered the sliding surfaces are embedded in the soft material elements, and the concave portions for embedding the foreign matters are formed to a helical form. In other words, a helical groove 25 is formed in the outer circumferential surface of the supporting shaft 7 and the above soft material elements 23 are buried in the helical groove 25. Further, in this ninth embodiment, an exit port 15a of the oil filler port 15 is also open in the upper surface of the supporting shaft 7.

In this way, when the helical groove 25 is applied as the concave portion for burying soft material elements 23, it is advantageous in view of the cost because the helical groove 25 can easily be machined by a lathe.

In each of the sixth to ninth embodiments shown in the above FIGS. 10–13, soft material elements 23 are embedded in the concave portions 21, 22, 24 which serve as concave portions and in the helical groove 25 which also serves as a concave portion, but each of these concave portions can remain as they are concaved without burying soft material elements 23 of this like.

When the embodiment is arranged in this way, since the foreign matters entered between the sliding surfaces enter the concave portions 21, 22, 24 or the helical groove 25 and are caught before they reach the main load receiving portion C on the lower side, the foreign matters can be prevented to the utmost from reaching the main load receiving portion C. However, different from the case having the soft material elements embedded, it cannot deny a little possibility that the foreign matters escape from the concave portions 21, 22, 24 or the helical groove 25. However, in case of the helical groove 25, the foreign matters can easily escape outside through the helical groove 25, and in case of the concave portions 21, 22 where a number of the concave portions are disposed, the foreign matters become to be easily discharged while they pass successively a number of the concave portions.

It is noted that the present invention is not limited to embodiments as described above and illustrated in the drawings, and it is acceptable to perform the extension or modification of the embodiment as shown below.

The end of the helical groove 19 which constitutes the oil passage 20 can be terminated at the inner edge of the chamfer 9a of the bearing hole 9 of the roller 6.

It is allowable to provide a plurality of helical grooves 19, 25.

A means to set the supporting shaft 7 to the supporting arm 5 in a non-rotatable manner is not limited to press-fitting, but is allowable to use caulking-, pin-, key- and screw-setting.

The present invention can be applied to general roller supporting devices, and in this case, it is allowable to take a mechanism such that a mating member is held stationary and the roller supporting device moves to rotate the roller.

What is claimed is:

1. A roller supporting device comprising:
    a pair of supporting arms;
    a supporting shaft attached between the pair of supporting arms in a non-rotatable manner; and
    a roller having an inner hole in the central part thereof, the roller being disposed between the pair of supporting arms and being supported in a rotatable manner by means of the supporting shaft inserted through the bearing hole, the roller is arranged to rotate along with the relative movement with a mating member by making the roller contact with the mating member;
    wherein a helical groove is formed in the outer circumferential surface of the supporting shaft to thereby define a helically formed oil passage between the supporting shaft and the inner circumferential surface of the inner hole of the roller.

2. A roller supporting device according to claim 1, wherein the end portion of the oil passage is arranged to be open outside.

3. A roller supporting device comprising:
    a pair of supporting arms;
    a supporting shaft attached between the pair of supporting arms in a non-rotatable manner; and
    a roller having an inner hole in the central part thereof, the roller being disposed between the pair of supporting arms and being supported in a rotatable manner by means of the supporting shaft inserted through the bearing hole, the roller being arranged to rotate along with the relative movement with a mating member by making the roller contact with the mating member;
    wherein a groove is processed in the outer circumferential surface of the supporting shaft in a helical form and the soft material elements are embedded in the helical groove.

* * * * *